(12) United States Patent
Chen et al.

(10) Patent No.: US 8,411,747 B2
(45) Date of Patent: Apr. 2, 2013

(54) INTRA PREDICTION MODE SELECTING APPARATUS AND METHOD THEREOF

(75) Inventors: Yi-Chang Chen, Hsinchu (TW);
Chao-Tsung Huang, Kaohsiung (TW);
Yu-Wei Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 888 days.

(21) Appl. No.: 12/482,455

(22) Filed: Jun. 11, 2009

(65) Prior Publication Data
US 2010/0254459 A1  Oct. 7, 2010

(30) Foreign Application Priority Data
Apr. 2, 2009 (TW) .............................. 98111069 A (51) Int. Cl.
*H04N 7/12* (2006.01)
(52) U.S. Cl. .............................. 375/240.14; 375/240.12
(58) Field of Classification Search .................. 375/240, 375/240.01, 240.12, 240.13, 240.14, 240.16; 382/232
See application file for complete search history.

(56) References Cited

U.S. PATENT DOCUMENTS

| 2002/0075959 A1* | 6/2002 | Dantwala ................. 375/240.16 |
| 2005/0074062 A1 | 4/2005 | Sung et al. |
| 2006/0171600 A1* | 8/2006 | Kikuchi ......................... 382/232 |
| 2008/0137743 A1* | 6/2008 | Kim et al. ................ 375/240.13 |

FOREIGN PATENT DOCUMENTS

| CN | 101273641 | 9/2008 |
| TW | 200607357 | 2/2006 |

OTHER PUBLICATIONS

"First Office Action of China Counterpart Application", issued on May 3, 2011, p. 1-p. 4.
"Office Action of Taiwan Counterpart Application", issued on Jul. 27, 2012, p. 1-p. 6.

* cited by examiner

*Primary Examiner* — Allen Wong
(74) *Attorney, Agent, or Firm* — Jianq Chyun IP Office (57) ABSTRACT

An intra prediction mode selecting method is disclosed. First, a compress profile and a frame resolution of a frame data are received. Next, a plurality of corresponding prediction modes are selected according to the compress profile and the frame resolution, and the selected prediction modes are scheduled for sequentially calculating a plurality of corresponding cost functions. Finally, the cost functions are compared to select one of the prediction modes to serve as a prediction mode of the frame data.

4 Claims, 7 Drawing Sheets

INTRA PREDICTION MODE SELECTING APPARATUS AND METHOD THEREOF

CROSS-REFERENCE TO RELATED APPLICATION

This application claims the priority benefit of Taiwan application serial no. 98111069, filed on Apr. 2, 2009. The entirety of the above-mentioned patent application is hereby incorporated by reference herein and made a part of specification.

BACKGROUND OF THE INVENTION

1. Field of the Invention

The present invention relates to an intra prediction mode selecting apparatus and a method thereof. More particularly, the present invention relates to an intra prediction mode selecting apparatus with a format of H.264 and a method thereof.

2. Description of Related Art

With development of the electronic technology, image display techniques are accordingly developed. Especially, regarding an animation image display, to effectively improve a performance of the animation image of a display device, a plurality of image compression standards is provided, wherein H.264 is a most representative high compression digital video coding and decoding standard.

According to the H.264 coding and decoding standard, when an intra prediction mode to be selected is determined, cost functions of all possible intra modes have to be first calculated. The intra prediction modes include four categories of an I4 macro-block mode, an I8 macro-block mode, an I16 macro-block mode and a chroma mode, and the four categories of the intra prediction modes further include 26 sub-modes to be calculated. Moreover, the so-called close loop predictions have to be performed to the I4 macro-block mode and the I8 macro-block mode. Therefore, determination of the intra prediction mode to be selected consumes considerable hardware resources and bandwidth used for calculation. Accordingly, scheduling of the I4 macro-block mode, the I8 macro-block mode, the I16 macro-block mode and the chroma mode during the prediction is quite important.

Figure 1:
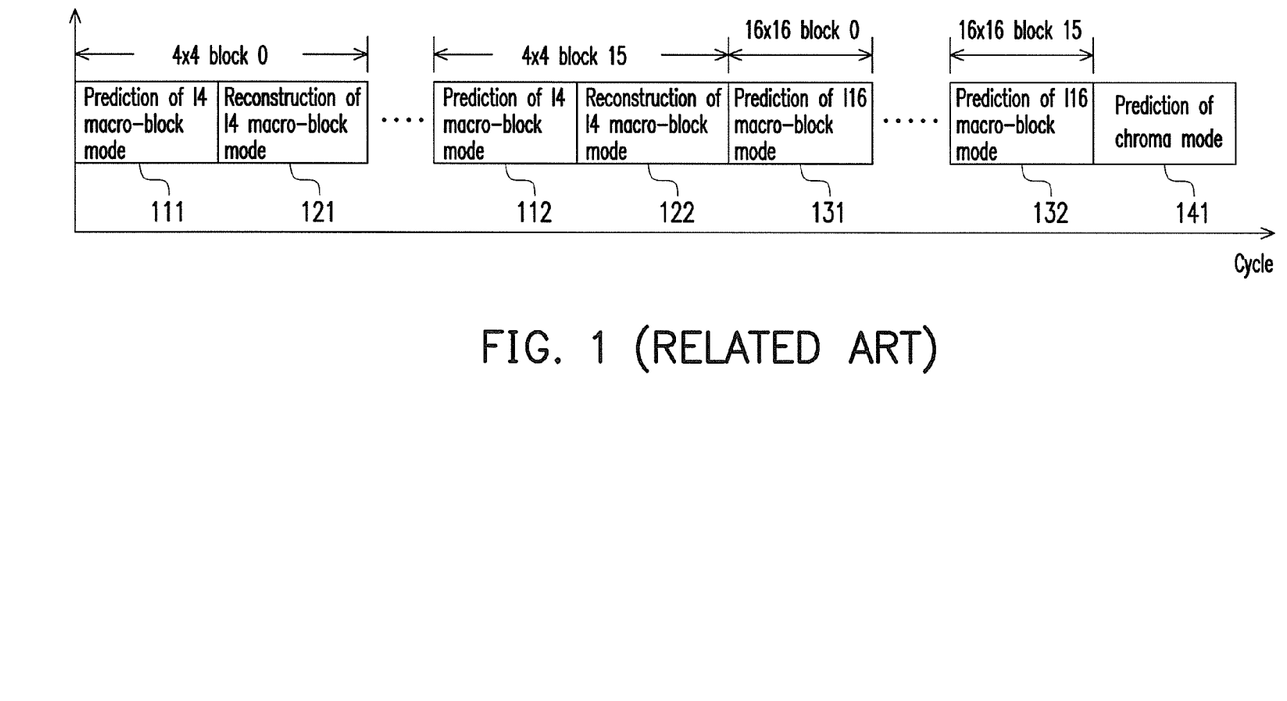
FIGS. 1-3 are a diagram respectively illustrating schedule methods of three conventional intra prediction modes.
Figure 2:
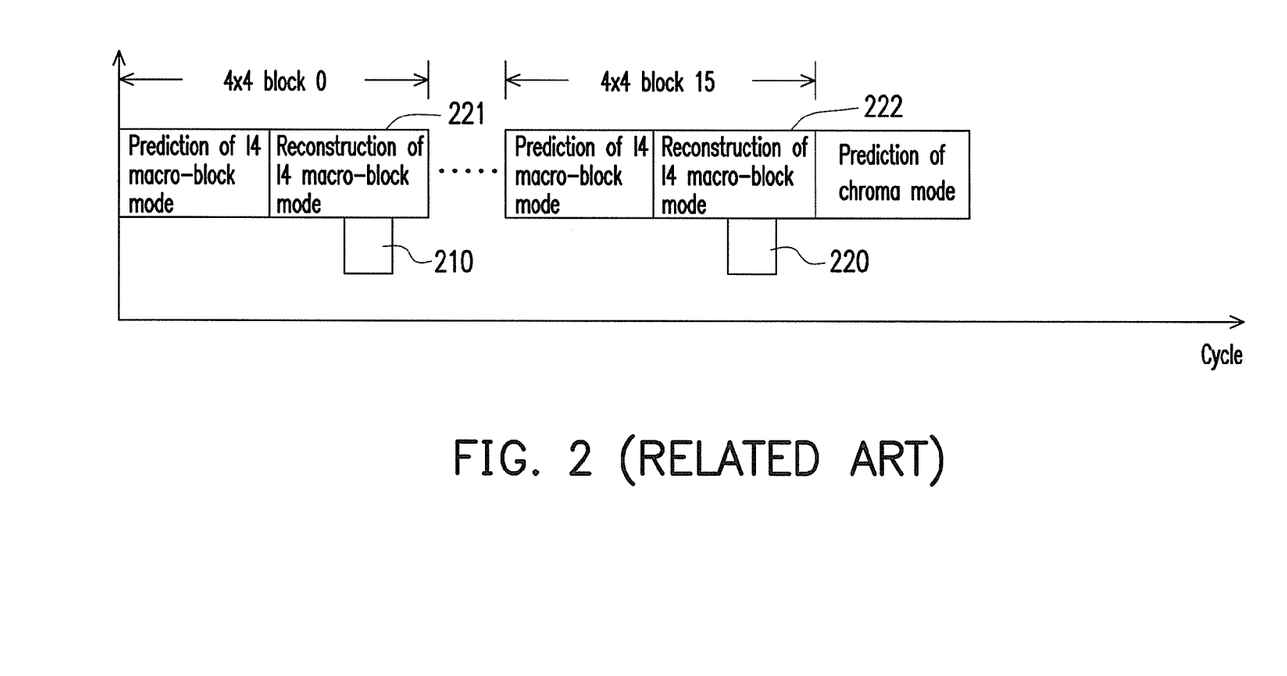

Referring to FIG. 1, FIG. 1 is a diagram illustrating a schedule method of a conventional intra prediction mode. As shown in FIG. 1, the predictions are sequentially performed in allusion to the I4 macro-block mode, the I16 macro-block mode and the chroma mode. In brief, predictions 111-112 of the I4 macro-block mode and reconstructions 121-122 of the I4 macro-block mode are sequentially performed in allusion to different blocks of a frame data. Then, predictions 131-132 of the I16 macro-block mode are sequentially performed in allusion to different blocks of the frame data. Finally, a prediction 141 of the chroma mode is performed. Referring to FIG. 2, FIG. 2 is a diagram illustrating an interlaced schedule method of a conventional intra prediction mode. Different to the schedule method of FIG. 1, predictions 231 and 232 of the I16 macro-block are respectively inserted in idle periods generated when reconstructions 221 and 222 of the I4 macro-block are performed. Thus, extra time for executing the predictions of the I16 macro-block can be effectively saved, so as to save a bandwidth of operation.

Figure 3:
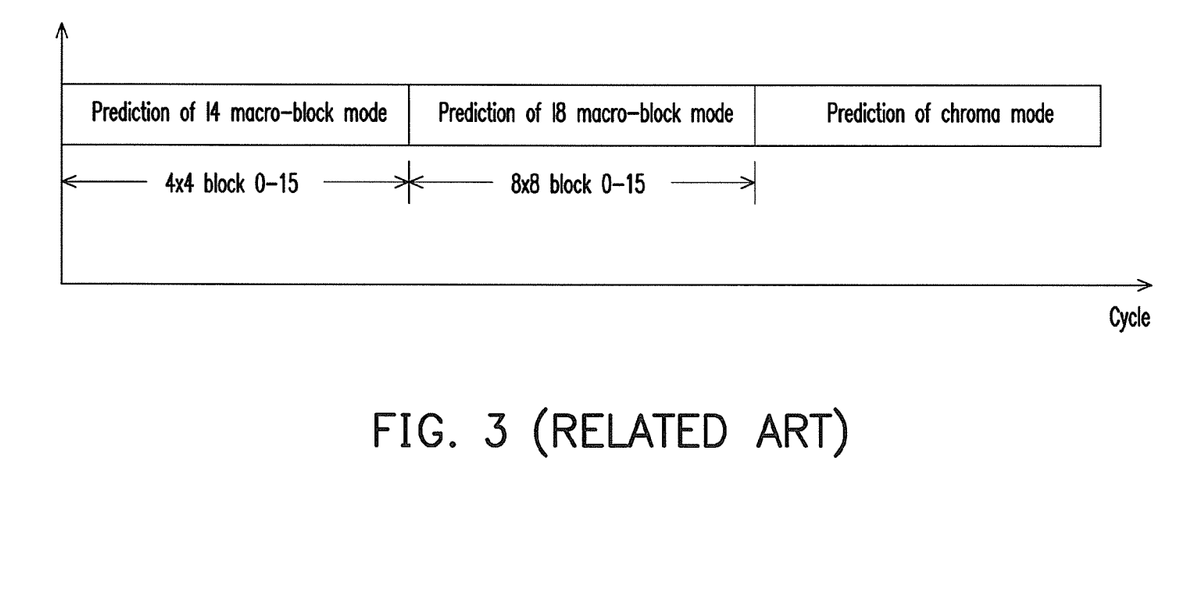

Since the I8 macro-block mode is not considered in both of the schedule methods of FIG. 1 and FIG. 2, another embodiment is provided below. FIG. 3 is a diagram illustrating a schedule method of a conventional high profile simplified intra prediction mode. According to the schedule method of FIG. 3, the I16 macro-block mode is neglected, and an open-loop operation (only the predictions of the I4 and I8 macro-block modes are performed, and the reconstructions thereof are not performed) is performed to reduce the required hardware resources and bandwidth.

SUMMARY OF THE INVENTION

The present invention is directed to an intra prediction mode selecting method, by which a plurality of prediction modes of a frame data is scheduled to sequentially generate a plurality of cost functions.

The present invention is directed to an intra prediction mode selecting apparatus, which can schedule a plurality of prediction modes of a frame data to sequentially generate a plurality of cost functions.

The present invention provides an intra prediction mode selecting method. The method comprises following steps. First, a compress profile and a frame resolution of a frame data are received. Next, a plurality of corresponding prediction modes are selected according to the compress profile and the frame resolution, and the selected prediction modes are scheduled for sequentially calculating a plurality of corresponding cost functions. Finally, the cost functions are compared to select one of the prediction modes to serve as a prediction mode of the frame data.

In an embodiment of the present invention, the compress profile comprises a high profile, a main profile or a base profile.

In an embodiment of the present invention, the frame resolution comprises a high resolution or a general resolution.

In an embodiment of the present invention, the prediction mode comprises an I4 macro-block mode, an I8 macro-block mode, an I16 macro-block mode and a chroma mode.

In an embodiment of the present invention, steps of selecting the corresponding prediction modes according to the compress profile and the frame resolution are as follows. The I4 macro-block mode, the I16 macro-block mode and the chroma mode are selected when the compress profile is the main profile and the frame resolution is the general resolution or the high resolution, and the I4 macro-block mode, the I16 macro-block mode and the chroma mode are selected when the compress profile is the base profile and the frame resolution is the general resolution or the high resolution. Moreover, the I4 macro-block mode, the I16 macro-block mode and the chroma mode are selected when the compress profile is the high profile and the frame resolution is the general resolution, and the I8 macro-block mode, the I16 macro-block mode and the chroma mode are selected when the compress profile is the high profile and the frame resolution is the high resolution.

In an embodiment of the present invention, steps of scheduling the prediction modes are as follows. When the selected prediction modes are the I4 macro-block mode, the I16 macro-block mode and the chroma mode, a prediction of the I16 macro-block mode is performed during a prediction idle time generated when a prediction of the I4 macro-block mode is performed, and a prediction of the chroma mode is performed during a reconstruction idle time generated when a reconstruction of the I4 macro-block mode is performed. Moreover, when the selected prediction modes are the I8 macro-block mode, the I16 macro-block mode and the chroma mode, a prediction of the I8 macro-block mode, a prediction of the I16 macro-block mode, a prediction of the chroma mode, and a reconstruction of the I8 macro-block mode are sequentially performed.

The present invention provides an intra prediction mode selecting apparatus comprising a schedule controller, a cost function generator and a cost function comparator. The schedule controller receives a compress profile and a frame resolution of a frame data, and selects a plurality of corresponding prediction modes according to the compress profile and the frame resolution, and schedules the prediction modes. The cost function generator is coupled to the schedule controller, and is used for sequentially predicting the prediction modes according to a prediction sequence of the prediction modes that is scheduled by the schedule controller, so as to generate a plurality of corresponding cost functions. The cost function comparator is coupled to the cost function generator, and is used for comparing the cost functions to select one of the prediction modes to serve as a prediction mode of the frame data.

In the present invention, the corresponding prediction modes are selected according to the compress profile and the frame resolution of the frame data, and the selected intra prediction modes are scheduled. Therefore, predictions are performed only in allusion to necessary prediction modes, so that a clock number and hardware resources required for the prediction calculations are effectively reduced. Moreover, based on a scheduling result, when a plurality of the prediction modes is predicted, the system resources can be effectively used, so as to reduce a cost and the power consumption of the apparatus.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 4:
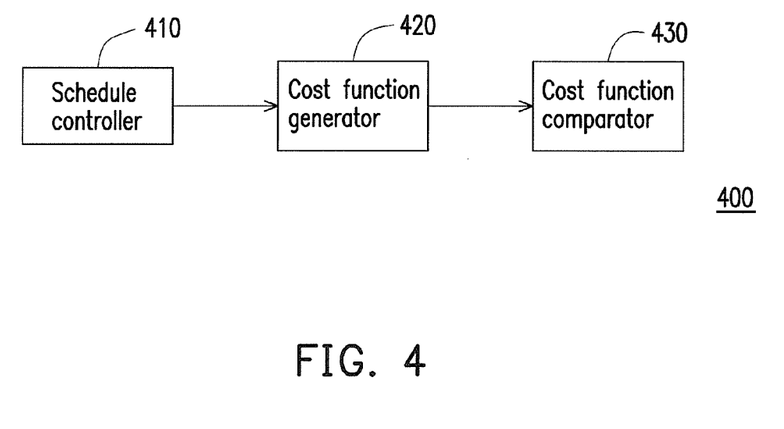
FIG. 4 is a diagram illustrating an intra prediction mode selecting apparatus 400 according to an embodiment of the present invention.

Referring to FIG. 4, FIG. 4 is a diagram illustrating an intra prediction mode selecting apparatus 400 according to an embodiment of the present invention. The intra prediction mode selecting apparatus 400 includes a schedule controller 410, a cost function generator 420 and a cost function comparator 430. The schedule controller 410 receives a compress profile and a frame resolution of a frame data to be processed, and selects a plurality of corresponding prediction modes according to the compress profile and the frame resolution, and schedules the selected prediction modes. The so-called compress profile includes a high profile, a main profile or a base profile, and the image resolution includes a high resolution FULL HD and a general resolution CIF. Moreover, in a domain of the H.264 coding and decoding standard, the above three profiles and two resolutions are known by those skilled in the art, and therefore detailed descriptions thereof are not repeated.

In addition, the prediction modes used in the H.264 coding and decoding standard generally includes an I4 macro-block mode, an I8 macro-block mode, an I16 macro-block mode and a chroma mode. The so-called I4 macro-block mode is an intra frame prediction performed based on a unit of 4×4 blocks in the frame data. Similarly, the I8 macro-block mode and the I16 macro-block mode are intra frame predictions performed base on units of 8×8 and 16×16 blocks in the frame data.

While the schedule controller 410 selects the prediction modes to be used, the selection is performed according to a following table 1.

TABLE 1

| Compress profile | Frame resolution | Selected prediction modes |
|---|---|---|
| Base profile | CIF | I4 macro-block mode, I16 macro-block mode and chroma mode |
| Base profile | FULL HD | I4 macro-block mode, I16 macro-block mode and chroma mode |
| Main profile | CIF | I4 macro-block mode, I16 macro-block mode and chroma mode |
| Main profile | FULL HD | I I4 macro-block mode, I16 macro-block mode and chroma mode |
| High profile | CIF | I4 macro-block mode, I16 macro-block mode and chroma mode |
| High profile | FULL HD | I8 macro-block mode, I16 macro-block mode and chroma mode |

According to the table 1, it is known that the schedule controller 410 can select suitable prediction modes to perform the predictions according to different categories of the compress profiles and the frame resolutions, so as to save a bandwidth of operation.

After the schedule controller 410 selects the prediction modes to be predicted, the schedule controller 410 schedules the selected prediction modes. Wherein, the schedule controller 410 performs different schedule methods in allusion to different selected prediction modes. To fully convey the spirit of the present invention to those skilled in the art, embodiments are provided below in allusion to different schedule methods.

Figure 5:
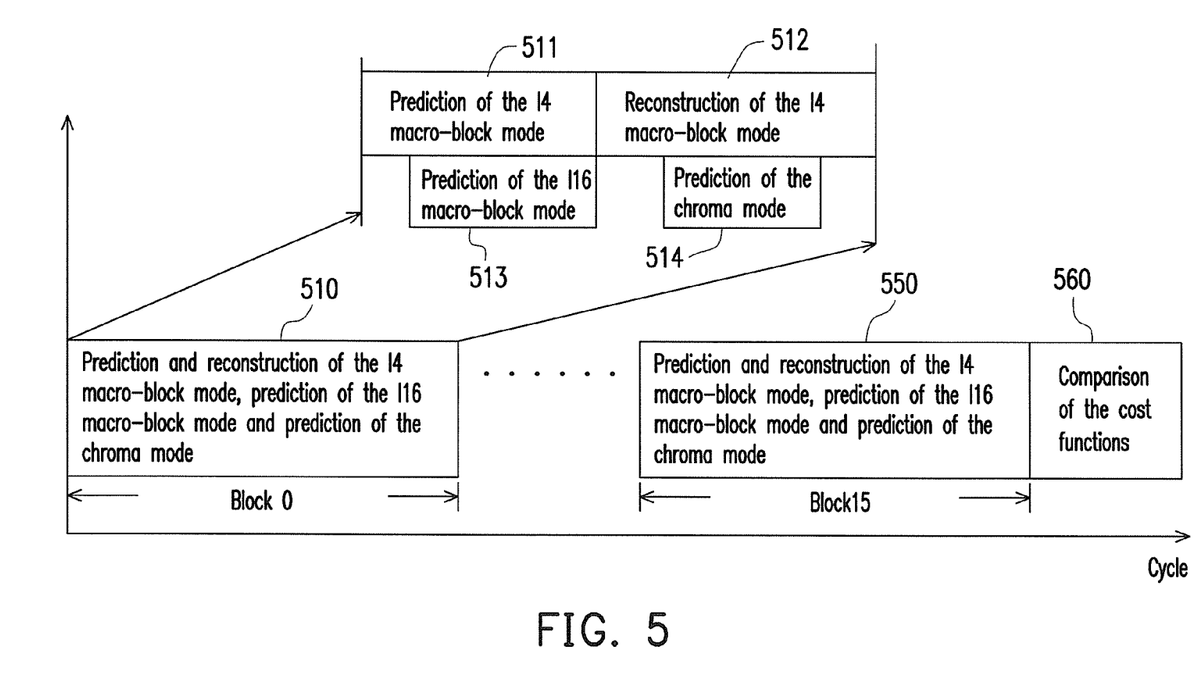
FIG. 5 is a diagram illustrating a schedule method performed by a schedule controller 410 according to an embodiment of the present invention.

Referring to FIG. 4 and FIG. 5, FIG. 5 is a diagram illustrating a schedule method performed by the schedule controller 410 according to an embodiment of the present invention. When the prediction modes selected by the schedule controller 410 are the I4 macro-block mode, the I16 macro-block mode and the chroma mode, the schedule controller 410 performs the scheduling according to the method shown in FIG. 5. Namely, a prediction 510 is first performed to a block 0 of the frame data, and the prediction 510 includes a prediction and a reconstruction of the I4 macro-block mode, a prediction of the I16 macro-block mode and a prediction of the chroma mode. In detail, a prediction 511 of the I4 macro-block mode is first performed, and then a reconstruction 512 of the I4 macro-block mode is performed. Moreover, a prediction 513 of the I16 macro-block mode is performed during a prediction idle time generated when the prediction 511 of the I4 macro-block mode is performed. Comparatively, a prediction 514 of the chroma mode is performed during a reconstruction idle time generated when the reconstruction 512 of the I4 macro-block mode is performed.

After the prediction of the block 0 of the frame data is completed, predictions of the blocks 1-15 of the frame data are sequentially performed, and after the prediction 550 of the block 15 of the frame data is completed, a comparison 560 of the cost functions is performed.

It should be noticed that the cost functions are correspondingly generated when various prediction modes are executed. Referring to FIG. 4 and FIG. 5, the cost function generator 420 correspondingly generates the cost functions according to a prediction sequence of the prediction modes that is scheduled by the schedule controller 410. In other words, after all of the prediction modes are executed, the cost functions corresponding to the prediction modes are also generated.

Therefore, when all of the prediction modes are executed, the cost function comparator 430 compares the cost functions, and selects a minimum cost function to serve as the prediction mode of the frame data. In brief, if the cost function corresponding to the I4 macro-block mode is less than the cost function corresponding to the I16 macro-block mode, the I4 macro-block mode is then selected to serve as the prediction mode of the frame data. Conversely, if the cost function corresponding to the I4 macro-block mode is greater than the cost function corresponding to the I16 macro-block mode, the I16 macro-block mode is then selected to serve as the prediction mode of the frame data.

Figure 6:
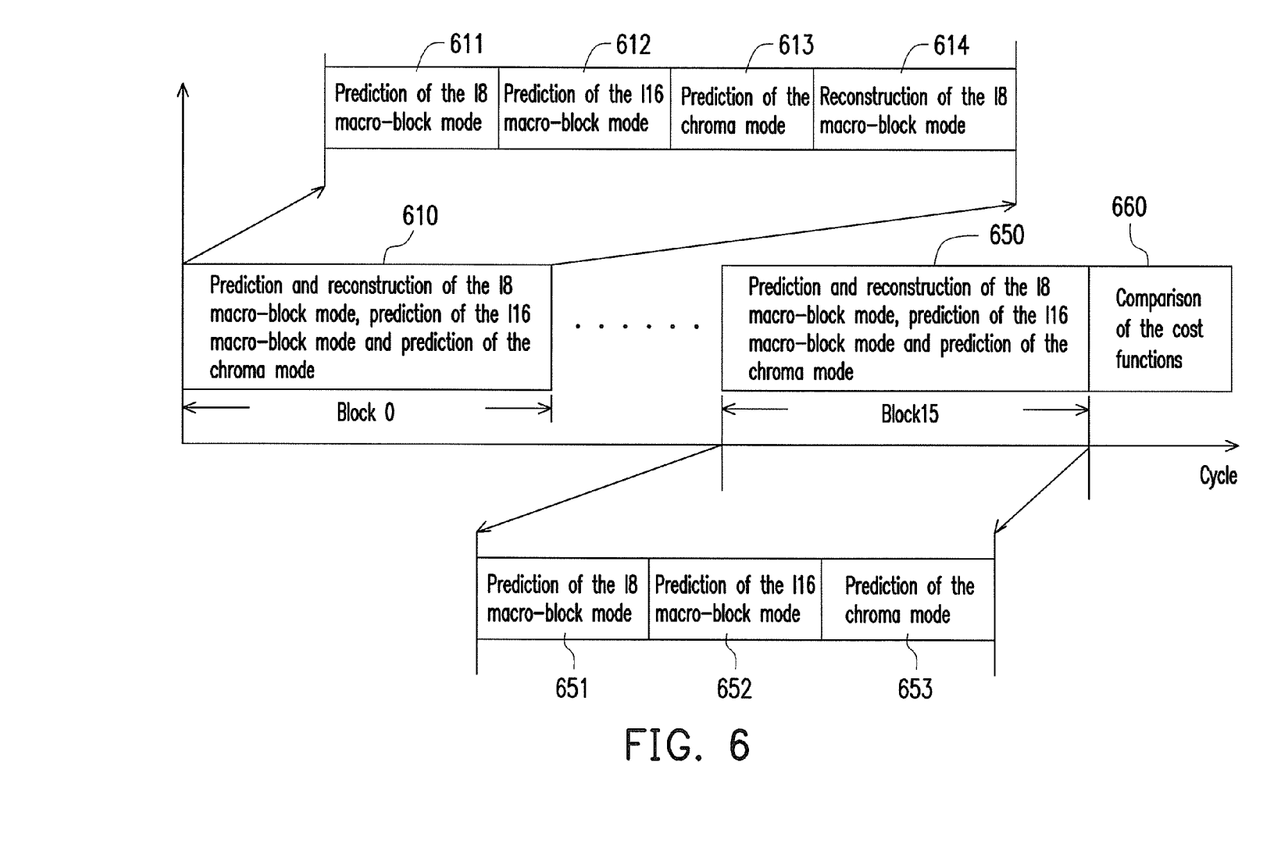
FIG. 6 is a diagram illustrating another schedule method performed by a schedule controller 410 according to an embodiment of the present invention.

Referring to FIG. 4 and FIG. 6, FIG. 6 is a diagram illustrating another schedule method performed by the schedule controller 410 according to an embodiment of the present invention. When the prediction modes selected by the schedule controller 410 are the I8 macro-block mode, the I16 macro-block mode and the chroma mode, the schedule controller 410 performs the scheduling according to the method shown in FIG. 6. Namely, a prediction 610 is first performed to a block 0 of the frame data, and the prediction 610 includes a prediction and a reconstruction of the I8 macro-block mode, a prediction of the I16 macro-block mode and a prediction of the chroma mode. In detail, a prediction 611 of the I8 macro-block mode is first performed. Then, a prediction 612 of the I16 macro-block mode is performed, and a prediction 613 of the chroma mode is performed, and finally a reconstruction 614 of the I8 macro-block mode is performed.

After the prediction of the block 0 is completed, predictions of the blocks 1-15 are sequentially performed. It should be noticed that when a prediction 650 of the block 15 is performed, since the block 15 is the last block, after a prediction 651 of the I8 macro-block mode, a prediction 652 of the I16 macro-block mode and a prediction 653 of the chroma mode are completed, reconstruction of the I8 macro-block mode is unnecessary. This is because the block 15 is already the last block, so that reconstruction of the I8 macro-block mode to provide information for predicting a next block is unnecessary.

Similar to the embodiment of FIG. 5, after the prediction 650 of the block 15 of the frame data is completed, the cost function comparator 430 performs a comparison 660 to the cost functions to select a suitable prediction mode. Here, the method of selecting the suitable prediction mode according to the cost functions is the same as the embodiment of FIG. 5, and therefore detailed descriptions thereof are not repeated.

An embodiment is provided below to describe the intra prediction mode selecting method of the present invention.

Figure 7:
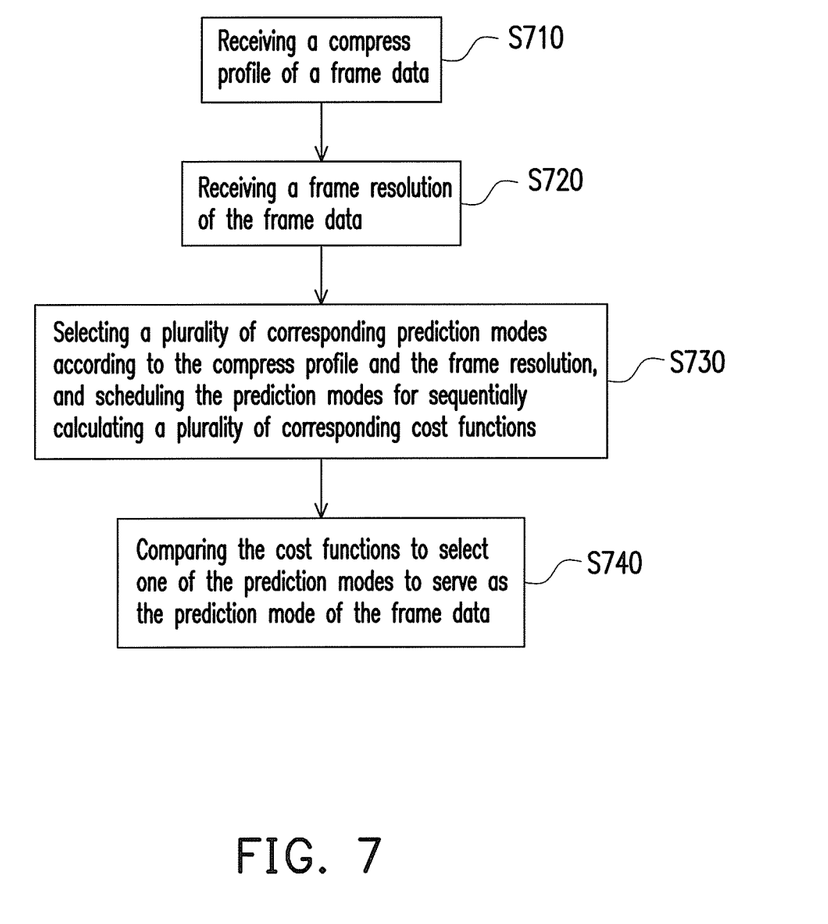
FIG. 7 is a flowchart illustrating an intra prediction mode selecting method according to an embodiment of the present invention.

Referring to FIG. 7, FIG. 7 is a flowchart illustrating an intra prediction mode selecting method according to an embodiment of the present invention. The method includes following steps. First, a compress profile and a frame resolution of a frame data are respectively received (steps S710 and S720). Wherein, in the H.264 coding and decoding standard, the compress profile includes the main profile, the base profile and the high profile, and the frame resolution includes the high resolution FULL HD and the general resolution CIF. Next, a plurality of corresponding prediction modes are selected according to the compress profile and the frame resolution, and the selected prediction modes are scheduled for sequentially calculating a plurality of corresponding cost functions (step S730).

Next, the cost functions obtained according to the step S730 are compared, and one of the prediction modes is selected to serve as the prediction mode of the frame data (step S740). Comparison of the cost functions is to, for example, obtain a minimum cost function, so as to select a corresponding prediction mode to serve as the prediction mode of the frame data.

In summary, the corresponding prediction modes are selected according to the compress profile and the frame resolution of the frame data, and the selected prediction modes are scheduled to sequentially generate the corresponding cost functions. By such means, the hardware resources and the bandwidth used for calculations can be effectively saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An intra prediction mode selecting method of a video encoder, comprising:

receiving a compress profile of a frame data;

receiving a frame resolution of the frame data;

selecting a plurality of corresponding intra prediction modes according to the compress profile and the frame resolution, and scheduling the intra prediction modes for sequentially calculating a plurality of corresponding cost functions; and comparing the cost functions to select one of the intra prediction modes to serve as a prediction mode of the frame data, wherein the compress profile comprises a high profile, a main profile or a base profile, the frame resolution comprises a high resolution or a general resolution, and the intra prediction modes comprise an I4 macro-block mode, an I8 macro-block mode, an I16 macro-block mode and a chroma mode, wherein steps of selecting the corresponding intra prediction modes according to the compress profile and the frame resolution comprise:

selecting the I4 macro-block mode, the I16 macro-block mode and the chroma mode when the compress profile is the main profile and the frame resolution is the general resolution or the high resolution;

selecting the I4 macro-block mode, the I16 macro-block mode and the chroma mode when the compress profile is the base profile and the frame resolution is the general resolution or the high resolution;

selecting the I4 macro-block mode, the I16 macro-block mode and the chroma mode when the compress profile is the high profile and the frame resolution is the general resolution; and selecting the I8 macro-block mode, the I16 macro-block mode and the chroma mode when the compress profile is the high profile and the frame resolution is the high resolution.

2. The intra prediction mode selecting method of the video encoder as claimed in claim 1, wherein steps of scheduling the intra prediction modes comprise:

when the selected intra prediction modes are the I4 macro-block mode, the I16 macro-block mode and the chroma mode, performing a prediction of the I16 macro-block mode during a prediction idle time generated when a prediction of the I4 macro-block mode is performed, and performing a prediction of the chroma mode during a reconstruction idle time generated when a reconstruction of the I4 macro-block mode is performed; and when the selected intra prediction modes are the I8 macro-block mode, the I16 macro-block mode and the chroma mode, sequentially performing a prediction of the I8 macro-block mode, a prediction of the I16 macro-block mode, a prediction of the chroma mode, and a reconstruction of the I8 macro-block mode.

3. An intra prediction mode selecting apparatus, comprising a schedule controller, receiving a compress profile and a frame resolution of a frame data, selecting a plurality of corresponding intra prediction modes according to the compress profile and the frame resolution, and scheduling the intra prediction modes, wherein the compress profile comprises a high profile, a main profile or a base profile, the frame resolution comprises a high resolution or a general resolution, and the intra prediction modes comprise an I4 macro-block mode, an I8 macro-block mode, an I16 macro-block mode and a chroma mode;

a cost function generator, coupled to the schedule controller, for sequentially predicting the intra prediction modes according to a prediction sequence of the intra prediction modes that is scheduled by the schedule controller, so as to generate a plurality of corresponding cost functions; and a cost function comparator, coupled to the cost function generator, for comparing the cost functions to select one of the intra prediction modes to serve as a prediction mode of the frame data, wherein, when the compress profile is the main profile and the frame resolution is the general resolution or the high resolution, the schedule controller selects the I4 macro-block mode, the I16 macro-block mode and the chroma mode;

when the compress profile is the base profile and the frame resolution is the general resolution or the high resolution, the schedule controller selects the I4 macro-block mode, the I16 macro-block mode and the chroma mode;

when the compress profile is the high profile and the frame resolution is the general resolution, the schedule controller selects the I4 macro-block mode, the I16 macro-block mode and the chroma mode; and when the compress profile is the high profile and the frame resolution is the high resolution, the schedule controller selects the I8 macro-block mode, the I16 macro-block mode and the chroma mode.

4. The intra prediction mode selecting apparatus as claimed in claim 3, wherein when the selected intra prediction modes are the I4 macro-block mode, the I16 macro-block mode and the chroma mode, the schedule controller controls the cost function generator to perform a prediction of the I16 macro-block mode during a prediction idle time generated when the cost function generator performs a prediction of the I4 macro-block mode, and to perform a prediction of the chroma mode during a reconstruction idle time generated when the cost function generator performs a reconstruction of the I4 macro-block mode; and when the selected intra prediction modes are the I8 macro-block mode, the I16 macro-block mode and the chroma mode, the schedule controller controls the cost function generator to sequentially perform a prediction of the I8 macro-block mode, a prediction of the I16 macro-block mode, a prediction of the chroma mode, and a reconstruction of the I8 macro-block mode.

* * * * *